United States Patent
Hazama

Patent Number: 5,284,619
Date of Patent: Feb. 8, 1994

[54] HYDROGEN ABSORBING ELECTRODE FOR USE IN NICKEL-METAL HYDRIDE SECONDARY BATTERIES

[75] Inventor: Tokuichi Hazama, Kyoto, Japan

[73] Assignee: Japan Storage Battery Company, Limited, Kyoto, Japan

[21] Appl. No.: 672,996

[22] Filed: Mar. 21, 1991

[30] Foreign Application Priority Data

| Mar. 24, 1990 [JP] | Japan | 2-74629 |
| Mar. 24, 1990 [JP] | Japan | 2-74630 |
| Mar. 24, 1990 [JP] | Japan | 2-74631 |

[51] Int. Cl.$^5$ .............................................. H01M 4/24
[52] U.S. Cl. ............................ 420/455; 429/223; 420/580; 420/900
[58] Field of Search ............... 420/455, 580, 900; 423/644; 429/223

[56] References Cited

U.S. PATENT DOCUMENTS

| 4,487,817 | 12/1984 | Willems et al. | 429/27 |
| 5,008,164 | 4/1991 | Furukawa et al. | 420/455 |

FOREIGN PATENT DOCUMENTS

| 0206776 | 12/1986 | European Pat. Off. | |
| 0271043 | 6/1988 | European Pat. Off. | |
| 405559 | 1/1991 | European Pat. Off. | |
| 0420669 | 4/1991 | European Pat. Off. | 4/38 |
| 60-250557 | 12/1985 | Japan | |
| 62-119864 | 6/1987 | Japan | 4/38 |
| 62-249358 | 10/1987 | Japan | 4/38 |
| 63-304570 | 12/1988 | Japan | 4/38 |
| 1-162741 | 6/1989 | Japan | |
| 1-267966 | 10/1989 | Japan | |
| 2-104686 | 4/1990 | Japan | |
| 2-148568 | 6/1990 | Japan | 4/38 |
| 2-165563 | 6/1990 | Japan | |
| 2-174063 | 7/1990 | Japan | 4/24 |
| 2-220354 | 9/1990 | Japan | 4/24 |

OTHER PUBLICATIONS

Power Sources 12, Research and Development in Non-Mechanical Electrical Power Sources, Proceedings of the 16th International Power Sources Symposium, article by H. Ogawa et al., entitled "Metal Hydride Electrode for High Energy Density Sealed Nickel-Metal Hydride Battery", (Sep. 1988).

*Primary Examiner*—R. Dean
*Assistant Examiner*—Margery S. Phipps
*Attorney, Agent, or Firm*—Sughrue, Mion, Zinn, Macpeak & Seas

[57] ABSTRACT

A mixture of rare earth elements, in which La is comprised from 75 to 90 wt % of rare earth elements, with the balance being Ce, Nd, Pr and other rare earth elements (the mixture being referred to as a highly lanthanum-rich misch metal, and is hereinafter designated Lm), is used to produce a hydrogen absorbing alloy having a composition represented by $LmNi_{x-A-B}Co_AAl_B$, $Lm_{1-x}Zr_xNi_{Y-A-B}Co_AAl_B$, or $Lm_{1-x}Zr_xNi_{Y-A-B-C}Co_AMn_BAl_C$. By using these hydrogen absorbing alloys as negative electrode materials, nickel metal hydride secondary batteries can be fabricated that have a large discharge capacity and that also have excellent cycle life and high rate discharge characteristics. Such electrode characteristics that are balanced between the aspects of discharge capacity and cycle life have heretofore been unattainable by either La alone or a misch metal having a relatively low La content or a conventional lanthanum-rich misch metal. The newly developed alloys will not deteriorate in characteristics even if they are stored under adverse conditions for a prolonged time and hence are capable of supplying batteries having consistent quality. The starting material Lm for these alloys is relatively inexpensive and it contains reasonable amounts of Ce, Nd and Pr which are effective in extending the cycle life. This permits the adoption of alloy compositions in which expensive Co is used in a smaller amount. Hence, the alloys have high practical value for use as inexpensive hydrogen absorbing electrode materials.

6 Claims, 4 Drawing Sheets

HYDROGEN ABSORBING ELECTRODE FOR USE IN NICKEL-METAL HYDRIDE SECONDARY BATTERIES

BACKGROUND OF THE INVENTION

This invention relates to a nickel-metal hydride secondary battery using a hydrogen absorbing alloy as the negative electrode material and a nickel oxide as the positive electrode material. More particularly, this invention relates to a hydrogen absorbing electrode for use in nickel-metal hydride secondary batteries that has a large charge-discharge capacity, that experiences only small deterioration in characteristics during prolonged repetition of charge and discharge cycles, and that withstands discharge at large current with a smaller drop in discharge capacity.

As a promising candidate for a high energy density storage battery, a nickel-metal hydride secondary battery has been proposed and intensive efforts are being made to develop commercial products. This battery uses a hydrogen absorbing alloy as the negative electrode material, which absorbs and desorbs hydrogen reversibly, and the absorbed hydrogen is used as an active material. The ideal hydrogen absorbing alloy for use in this nickel-metal hydride secondary battery should satisfy the following requirements:

(1) a large amount of available hydrogen should be absorbed/desorbed; (2) the hydrogen dissociation pressure at equilibrium (or the hydrogen equlibrium pressure) should be in the range of from $10^{-3}$ to a few atmospheres at operating temperatures of a battery ($-20°$ to $60°$ C/);

(3) it should have high resistance to the corrosive action of concentrated alkaline electrolytes;

(4) the pulverization rate due to repeated charge and discharge should be low;

(5) it should not experience compositional changes due to such factors as the dissolution of certain elements during repeated electrode reaction;

(6) the hydrogen diffusion rate should be high enough to cause a small reaction resistance (overpotential);

(7) it should not experience deterioration in characteristics during prolonged storage in the air atmosphere; and (8) it should be inexpensive.

Among the conventionally known inexpensive materials that contain rare earth elements is misch metal (which is hereinafter sometimes designated Mm for differentiation from Lm of the present invention in terms of the composition of rare earth elements). Misch metal is a mixture of rare earth elements and usually comprise 25-35 wt % La, 45-55 wt % Ce and 10-15 wt % Nd. Since Ce assumes a large proportion of the rare earth element content, a hydrogen absorbing alloy prepared from Mm has a high hydrogen equilibrium pressure. In order to reduce the hydrogen pressure to less than about one atmosphere in the operating temperature range of batteries, part of Ni must be replaced by Co, Mn, or Al (the respective cases are hereunder referred to simply as Co substitution, Mn substitution, and Al substitution). In hydrogen absorbing alloys of the MmNiCoAl system, the absorption of available hydrogen usually decreases with the increasing amount of Co substitution, and batteries using such alloy have a correspondingly smaller discharge capacity, but exhibit a longer cycle life. Hence, it is advisable to minimize the amount of Co substitution within a range where satisfactory cycle life characteristics are maintained. It has been verified experimentally that the minimum and necessary amount of Co substitution for obtaining good cycle life characteristics is 0.6 to 0.7. Further, it has recently been found that alloys having a lesser Co substitution but an increased Ni content have satisfactory quick discharge characteristics.

Aluminum is effective for improving the cycle life characteristics of a battery. It has recently become clear that Al dissolves into alkali electrolytes. Although the exact mechanism for life extension by Al is not known, it would form compounds such as potassium aluminate and act in a way to retard the oxidation of the alloy. However, excessive Al substitution will act in a way to increase the reaction resistance of the electrode, whereby the overpotential is increased to deteriorate the high rate discharge characteristics and the discharge characteristics at low temperatures. Hence, in order to obtain hydrogen absorbing alloys of the MmNiCoAl system that exhibit good electrode characteristics, the Al substitution must also be reduced to the minimum necessary level. This approach has been adopted in the development of the alloy MmNi$_{3.5}$Co$_{0.7}$Al$_{0.8}$ which, as will be described hereinafter, provides an initial discharge capacity of 254 mAh/g, as well as excellent cycle life characteristics; however, the high rate discharge characteristics of this alloy are not necessary satisfactory. In short, when using Ce-rich Mm as a starting material for hydrogen absorbing alloys, a considerable amount of Al substitution is necessary to lower the hydrogen equilibrium pressure and this has presented difficulty in preparing alloys that are satisfactory in all aspects of discharge capacity, cycle life characteristics, high rate discharge characteristics, and low-temperature discharge characteristics.

In an attempt to make improvements on MmNiCoAl alloys having a comparatively small discharge capacity, MmNiCoMnAl alloys having part of Ni replaced by Mn have been recently proposed. The Mn substitution is effective for the purpose of increasing the discharge capacity of a battery but recently reported phenomenon in which Mn present in the neighborhood of the surface of alloy particles dissolves into the electrolyte upon repeated charge and discharge cycles has revealed the possibility that Mn substitution shortens the cycle life of the battery. Hence, if one effects Mn substitution, he also has to take a measure for preventing the deterioration of cycle life characteristics by inhibiting the dissolution of Mn into the electrolyte. However, no effective method for achieving this has yet been discovered.

Further, MmNiCoAl alloys in which Mm has high Ce content have had the problem of deterioration during storage since they contain easily oxidizable Ce. In the process of producing electrodes, the hydrogen absorbing alloy can sometimes be left in powder form for a prolonged time for several reasons such as the need for stockpiling for process levelling and the occurrence of problems in the production equipment. Care must be taken to insure that no changes will occur in the electrode characteristics of the alloy even in those cases, but alloys using Mm will experience a drop in initial discharge capacity, particularly when they are stored under hot and humid conditions for a prolonged time. This is due to the oxidation of the alloys. While there are several methods that can be used to avoid this problem, the most important thing is to prepare alloys that can be left to stand for a prolonged time without deterioration in their characteristics. However, in the case of Mm-using alloys which have a high content of Ce that is inherently prone to oxidation, the efforts to improve the storage characteristics of alloys have been limited even if they have good cycle life characteristics.

As described above, using Ce-rich and inexpensive Mm as a starting material for producing hydrogen absorbing alloys has involved various problems in association with each of the cases of Co-, Al- and Mn-substitution and it has been difficult to design alloys taking into account all factors of battery performance including discharge capacity, cycle life characteristics, high rate discharge characteristics, low-temperature discharge characteristics and long-term storage characteristics.

BRIEF SUMMARY OF THE INVENTION

Under these circumstances, the present inventors have found that hydrogen absorbing alloy suitable for use in a nickel-metal hydride secondary battery that have a large discharge capacity, that have a long cycle life, that will experience only a small drop in capacity during high rate discharge, that permit efficient charge at low temperatures and that yet can be stored for a prolonged period with a smaller drop in capacity can be produced from an inexpensive and highly lanthanum-rich misch metal (which is a mixture of rare earth elements in which La comprises from 75 to 90 wt % of the total content of rare earth elements, with the balance being Ce, Nd, Pr and other rare earth elements, and is hereinafter designated Lm), while reducing the amounts of substitution of Co which is expensive and Al which is deleterious to the high rate discharge characteristics of the battery. The present invention provides three alloy systems represented by the following compositional formulas:

$LmNi_{X-A-B}Co_A Al_B$, $Lm_{1-X}Zr_X Ni_{Y-A-B}Co_A Al_B$ and $Lm_{1-X}Zr_X Ni_{Y-a-B-C}Co_A Mn_B Al_C$

(1) $Lm_{ni}X_{-A-B}Co_A Al_R$ alloys

Hydrogen absorbing electrode alloys having not only a large discharge capacity but also good cycle life and high rate discharge characteristics could be developed using Lm containing at least 75 wt % La and by minimizing the amounts of Co and Al substitution. The newly developed hydrogen absorbing electrode alloys are represented by the general formula $LmNi_{X-A-B}Co_A Al_B$, in which Lm used as a starting material has a La to Lm ratio (La/Lm) of from 75 to 90 wt %, with the balance being Ce, Nd, Pr and other rare earth elements. In these alloys, Ni is partly replaced by Co and Al, as indicated by the formula. By adopting alloy compositions that satisfied the relationships $4.9 \leq 5.1$, $1.2 \leq A+B \leq 2.0$, $0.7 \leq A \leq 1.6$, and $0.3 \leq B \leq 0.6$, the present inventor solved the various problems discussed in the Background of the Invention.

Using alloys having part of the Ni replaced by Co and Al as indicated by the compositional formula shown above, hydrogen absorbing electrodes, but which yet would not experience deterioration of their characteristics during prolonged repetition of charge and discharge cycles, without a high Co content, could be produced. Further, the alloys adopted a compositional design characterized by the high content of La in Lm and the low substitution of Co and Al and, hence, had a large charge/discharge capacity and good high rate discharge characteristics. For improvement in the long-term storage characteristics, it is important that not only an alloy composition having good cycle life characteristics be designed but also the content of La in the starting Lm should lie within the appropriate range set forth above.

(2) $Lm_{1-x}Zr_x Ni_{Y-A-B}Co_A Al_B$ alloys

Hydrogen absorbing electrode alloys having improved discharge capacity, cycle life characteristics and high rate discharge characteristics could be developed using Lm containing at least 75 wt % La and by replacing part of Lm with a small amount of Zr (the replacement is hereinafter referred to simply as Zr substitution) while replacing part of Ni with the minimum necessary amount of Co. The newly developed hydrogen absorbing electrode alloys are represented by the formula $Lm_{1-x}Zr_x Ni_{Y-A-B}Co_A Al_B$, in which Lm used as a starting material has a La to Lm ratio (La/Lm) of 75–90% wt %, with the balance being Ce, Nd, Pr and other rare earth elements, and in which Lm is partly replaced by Zr and part of Ni by Co and Al. The alloys should satisfy the following compositional relationships: $0.01 \leq 0.08$, $4.9 \leq Y \leq 5.1$, $1.0 \leq A+B \leq 1.5$, $0.5 \leq A \leq 1.1$, and $0.3 \leq B \leq 0.6$.

Using alloys having part of Lm replaced by Zr and part of Ni by Co and Al as indicated by the compositional formula shown above, hydrogen absorbing electrodes which would not experience deterioration in their characteristics during prolonged repetition of charge and discharge cycles could be produced. The improvement in the cycle life characteristics of these alloys would probably have been achieved because Zr formed an oxide film on the surface of the alloy and because that film improved the corrosion resistance of the alloy without impeding the diffusion of H ions, thereby retarding the oxidation of rare earth elements. Further, the alloys adopted a compositional design characterized by the high content of La in Lm and the low substitution of Co and Al; Hence, the alloys had a large charge/discharge capacity and good high rate discharge characteristics. For improvement in the long-term storage characteristics, it is important that not only an alloy composition having good cycle life characteristics be designed, but also the content of La in the starting Lm should lie within the appropriate range set forth above.

(3) $Lm_{1-x}Zr_x Ni_{Y-A-B-C}Co_A Mn_B Al_C$ alloys

Hydrogen absorbing electrode alloys having not only high capacity but also good cycle life and high rate discharge characteristics could be developed from a LmNiCoMnAl system using Lm containing at least 75 wt % La, and by minimizing the amount of substitution while replacing part of Lm with a small amount of Zr. The newly developed hydrogen absorbing electrode alloys are represented by the formula $Lm_{1-x}Zr_x Ni_{Y-A-B-C}Co_A Mn_B Al_C$, in which Lm used as a starting material has a La to Lm ratio (La/Lm) of 75 to 90% wt %, with the balance being Ce, Nd, Pr and other rare earth elements, and in which Lm is partly replaced by Zr and part of Ni by Co and Al. By adopting alloys compositions that satisfied the relationship $0.01 \leq X \leq 0.08$, $4.9 \leq Y \leq 5.1$, $1.0 \leq A+B+C \leq 1.5$, $0.6 \leq A \leq 1.1$, $0.2 \leq B \leq 0.3$, and $0.1 \leq C \leq 0.4$, the present inventors solved the various problems discussed in the Background of the Invention.

Hydrogen absorbing alloys of the LmNiCoMnAl system are intended to have an increased discharge capacity by replacing part of Ni with Mn but due to the dissolution of Mn on the alloy surface into an electrolyte, these alloys do not have very good cycle life characteristics. Hence, by using alloys having part of Ni replaced with Co, Mn, and Al while replacing part of Lm with Zr as indicated by the compositional formula shown above, hydrogen absorbing electrodes that did not have a high Co content but which yet would not experience deterioration in their characteristics during prolonged repetition of charge/discharge cycles could be produced. This is probably because Zr formed an oxide film on the surface of the alloy and because that film improved the corrosion resistance of the alloy without impeding the diffusion of H$^+$ions, thereby retarding the oxidation of rare earth elements.

Further, the adoption of a compositional design characterized by the high content of La in Lm and the low substitution of Co and Al contributed to the accomplishment of electrodes having a large charge/discharge capacity and good high rate discharge characteristics. For improvement in the long-term storage characteristics, it is important that not only an alloy composition having good cycle life characteristics be designed, but also the content of La in the starting Lm should lie within the appropriate range set forth above.

As described above, hydrogen absorbing alloys represented by the formula $LmNi_{X-A-B}Co_AAl_B$ that used Lm with a La/Lm ratio of from 75 to 90 wt % as the starting material, and in which part of the Ni was replaced by Co and Al as indicated, and hydrogen absorbing alloys represented by the formula $Lm_{1-x}Zr_xNi_{Y-A-B}Co_AAl_B$, in which part of Lm was replaced by Zr and part of Ni by Co and Al as indicated, as well as hydrogen absorbing alloys represented by the general formula $Lm_{1-x}Zr_xNi_{Y-A-B-C}Co_AMn_BAl_C$ in which part of Lm was replaced by Zr and part of Ni by Co, Mn and Al as indicated are capable of producing electrodes having excellent characteristics if the compositions of the respective alloys satisfy the relationships already set forth above. The excellent characteristics of the electrodes include a large charge/discharge capacity, good cycle life characteristics, smaller capacity drop during high rate discharge, and the ability to maintain the initial characteristics (i.e., those at the time when the alloys are ground in the first step of electrode fabrication) during prolonged storage. Furthermore, the low price of Lm used as the starting material and the small content of expensive Co contribute to the making of inexpensive and yet highly practical hydrogen absorbing electrodes.

While the excellent electrode characteristics of the alloys of the present invention have been described above together with the mechanism of their action with reference to the case where they are used as hydrogen absorbing electrodes in nickel-metal hydride secondary batteries, it should be noted that the action of those alloys is common to all secondary batteries that use alkali electrolytes, and hydrogen absorbing electrodes made of those alloys can also be applied to secondary batteries, for example, those using manganese dioxide as the positive electrode material The alloys of the present invention can be expected to be applied to various uses such as chemical heat pumps, hydrogen storing or transporting vessels, hydrogen motor-vehicles and actuaters, because their hydrogen absorbing amounts are large, their hydrogen equilibrium pressures at room temperature are about a few atmospheric pressure, and the plateau is flat.

DETAILED DESCRIPTION OF THE INVENTION

Figure 1:
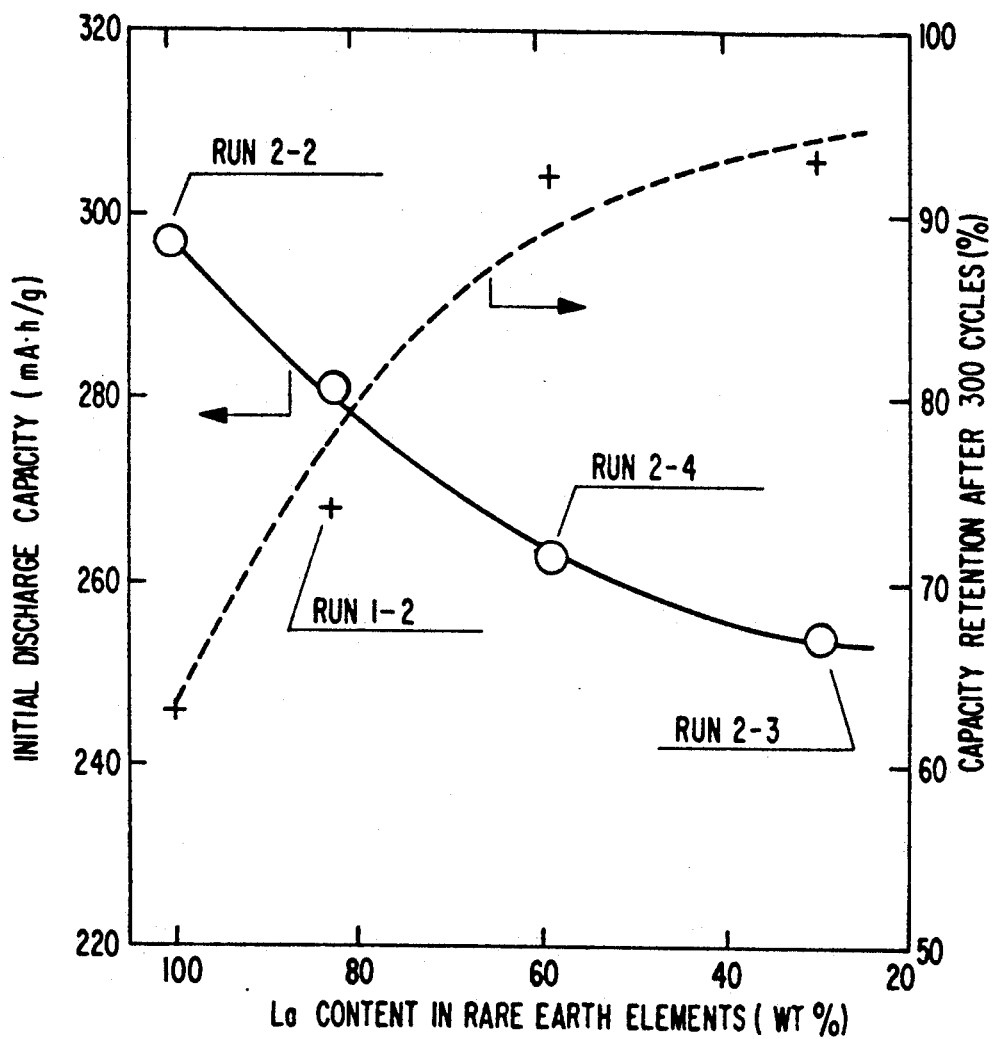
FIG. 1 is a graph showing the effects of the La content in the rare earth elements on the initial discharge capacity and cycle life characteristic of a hydrogen absorbing electrode.

The three types of alloy systems of the present invention, i.e., $LmNi_{X-A-B}Co_AAl_B$, $Lm_{1-x}Zr_xNi_{Y-A-B}Co_AAl_B$, and $Lm_{1-x}Zr_xNi_{Y-A-B-C}Co_AMn_BAl_C$, are described below in further detail in comparison with the conventional type alloy systems on the basis of actual test data.

(1) $LmNi_{X-A-B}Co_AAl_B$ alloys

In order to verify the advantages of this type of alloy, hydrogen absorbing alloys having the compositions shown in Table 1 were prepared by arc melting in an argon atmosphere. These alloys were mechanically ground and a copper coating layer corresponding to about 20 wt % was formed on the surface of alloy particles by electroless copper plating. To the alloy powders, an FEP (tetrafluoroethylene/fluoropropylene) resin was added as a binder in an amount corresponding to 10 wt % and powder mixtures each weighing about 300 mg (alloy weight, about 216 mg) were cold pressed into electrode pellets each measuring 13 mm in diameter and about 0.4 mm in thickness. The pellets were hot pressed at 300° C. together with a current collecting nickel mesh screen to fabricate alloy electrodes as test samples.

Using these hydrogen absorbing electrodes as a negative electrode, test batteries were constructed, with the positive electrode being the same nickel oxide electrode as conventionally used in nickel-cadmium batteries. A 6 M potassium hydroxide solution was used as an electrolyte. Each of the test batteries was of a negative electrode limited type in which the battery capacity was dependent on the capacity of the negative electrode, and a mercury oxide electrode was used as a reference electrode. The batteries were subjected to a prolonged cycle life test in a thermostatic chamber at 20° C., with one cycle consisting of charge at 40 mA for 2.5 h (hours), rest for 0.5 h, and discharge at 20 mA until the potential difference between the reference electrode and the hydrogen absorbing electrode dropped to −0.6 V. The test results for each alloy are shown in Table 1, in which the "capacity retention" is expressed by $C_{300}/C_{IM}$, where $C_{IM}$ is the initial maximum capacity and $C_{300}$ is the discharge capacity at 300 cycles after the time when the initial maximum capacity was reached; the capacity retention $C_{300}/C_{IM}$ is dealt with as an index of the cycle life characteristics. The alloys shown in Table 1 had about the similar hydrogen equilibrium pressures at room temperature each other, which were adjusted to one atmospheric pressure or less by controlling the amount of Al substitution.

The same test batteries were subjected to a high rate discharge test at different discharge currents The capacity retention at high rate discharge was calculated by dividing the discharge capacity at 300 mA by the discharge capacity at 20 mA, and the results vary in Table 1. The discharge rate at 300 mA vary somewhat depending on the alloy composition (and hence the discharge capacity), but it is substantially equivalent to the 0.2 h rate (5 CmA).

TABLE 1

| Run | Hydrogen absorbing alloy | Initial discharge capacity (mA·h/g) | Capacity retention after 300 cycle (%) | Capacity retention on high rate discharge (%) |
| --- | --- | --- | --- | --- |
| 1-1 | $LmNi_{3.0}Co_{1.6}Al_{0.4}$ | 275 | 87 | 59 |
| 1-2 | $LmNi_{3.5}Co_{1.1}Al_{0.4}$ | 281 | 74 | 65 |
| 1-3 | $LmNi_{3.8}Co_{0.7}Al_{0.5}$ | 286 | 71 | 71 |
| 2-1 | $LaNi_{2.5}Co_{2.4}Al_{0.1}$ | 265 | 71 | 48 |
| 2-2 | $LaNi_{3.5}Co_{1.2}Al_{0.3}$ | 297 | 63 | 70 |
| 2-3 | $MmNi_{3.5}Co_{0.7}Al_{0.8}$ | 254 | 93 | 43 |
| 2-4 | $LnNi_{3.5}Co_{0.8}Al_{0.7}$ | 263 | 92 | 52 |

The alloys in Run 2-1 and 2-2 were prepared using only La as a rare earth element. The alloy in Run 2-2 having a lower Co substitution had a larger initial discharge capacity than the alloy in Run 2-1, but it did not have a very good cycle life characteristic since its discharge capacity decreased at 300 cycles. However, this alloy experienced a comparatively small drop in discharge capacity on high rate discharge at a 0.2 h rate. Compared to the capacity retention at high rate discharge of the alloy in Run 2-1, the high rate discharge characteristic of the alloy in Run 2-2 was fairly good. This is probably because the higher the Ni content of the alloy, the higher the catalytic activity at the surface, thereby insuring smooth progress of the electrode reaction.

The alloy in Run 2-3 was prepared using the conventional Ce-rich Mm (30.0 wt % La). Because of the high Ce content, this alloy had a smaller initial discharge capacity than the above discussed LaNiCoAl alloys but its cycle life characteristic was very good. However, this alloy experienced a considerable capacity drop during high rate discharge compared to the alloy of Run 2—2 having the same Ni content. This would be because the high Ce content of Mm in the alloy of Run 2-3 necessitated high Al substitution in order to reduce the equilibrium hydrogen pressure to the appropriately low level, which eventually increased the overpotential to cause a considerable capacity drop during high rate discharge.

The alloy in Run 2-4 was prepared by melting a starting material that is conventionally called "lanthanum-rich misch metal" (which is hereunder designated Ln for the sake of convenience). The Ln contains 59.0 wt % La, 8.9 wt % Ce, 8.4 wt % Pr and 22.6 wt % Nd. The alloy in Run 2-4 which used Ln having a comparatively high La content was of substantially the same composition as the alloy in Run 2-3, and yet it had a somewhat largest initial discharge capacity although the improvement in discharge capacity was not remarkable. As in the alloy of Run 2-3, this alloy had a very long cycle life, but the capacity drop that occurred as a result of high rate discharge was substantial, although it was not as great as in the alloy of Run 2-3.

The alloys in Runs 1-1, 1-2 and 1-3 were within the scope of the present invention and the starting material was Lm, or a mixture of rare earth elements in which La comprised at least 75 wt %. More specifically, the Lm contained 82.5 wt % La, 2.6 wt % Ce, 8.9 wt % Nd and 3.3 wt % Pr. Apparently, the La content was considerably higher than in Mm and Ln used in the alloys of Runs 2-3 and 2-4, respectively. The initial discharge capacity increased in the order of Runs 1-1, 1-2 and 1-3 as the amount of Co substitution decreased. The alloy of Run 1-3 had a larger discharge capacity than the Mm containing alloy (Run 2-3) and the Ln containing alloy (Run 2-4) which had the same or similar level of Co substitution. The initial discharge capacity of the alloy in Run 1-2, which had the same Ni content as the alloys of Runs 2-2, 2-3, and 2-4, was smaller than that of Run 2-2 using La as the starting material, but it was much larger than those of the alloys in Runs 2-3 and 2-4 which used Mm and Ln, respectively, as the starting materials. The cycle life characteristics of the alloys in Runs 1-2 and 1-3 were somewhat poor. However, batteries in practical use are of positive electrode limited type and the depth of discharge is not as great as in the test described before; hence, for practical purposes, values of 70% and more in the evaluation by the testing method described above will be satisfactory and the performance of the alloys in Runs 1-2 and 1-3 will suffice for use in practical applications. Comparing the alloys of Runs 1-2, 2-2, 2-3, and 2-4 which had comparable formulas, the cycle life decreased in the order of Run 2-3 (Mm)>Run 2-4 (Ln)>Run 1-2 (Lm)>Run 2-2 (La). This reflects the fact that Ce and Nd as rare earth elements inhibit the deterioration of alloys and that the higher their contents, the better the cycle life characteristics.

The alloys of Runs 1-2 and 1-3 both experienced a small capacity drop during high rate. discharge and the charge retention rate was fairly high and comparable to the alloy of Run 2-2. The high La/Lm ratio and the corresponding decrease in the Al substitution would have probably contributed to good high rate discharge characteristics.

The above results show that the newly developed hydrogen absorbing electrode alloys that are prepared from Lm containing at least 75 wt % La and that are represented by the formula $LmNi_{x-A-B}Co_{A}Al_{B}$ exhibit good electrode characteristics if their composition satisfies the relationships $1.2 \leq A+B \leq 2.0$, $0.7 < A < 1.6$ and $0.4 \leq B \leq 0.6$ as demonstrated in Runs 1-1 to 1-3.

Although not mentioned above, the cycle life characteristics of alloys represented by the formula La (or Lm or Mm)$Ni_{z}$ will deteriorate if the ratio of La (or Lm or Mm) to Ni deviates from the stoichiometric value 1:5 (Z=5). When the degree of deterioration was investigated on alloys of the $La_{W}Nd_{0.15}Zr_{0.05}Ni_{3.8}Co_{0.7}Al_{0.5}$, non-stoichiometric alloys wherein W was 0.78 and 0.82 had lower capacity retention rates after 300 cycles than a stoichiometric (W=0.80) alloys by 14% and 15%, respectively. Since the drop in capacity retention rate is desirably 15% or less, the value of Z in the alloys represented by the above compositional formula must be within the range of from 4.9 to 5.1. The reason for the deterioration in cycle life characteristics would be the appearance of intermetallic compounds such as $La_{2}Ni$; in the alloy if Z in the above formula is less than 5.0 and the appearance of the single phase of Ni or Co if Z exceeds 5.0. This will also hold with alloy systems represented by the compositional formula $LmNi_{X-A-B}Co_{A}Al_{B}$, wherein the appropriate range of X is preferably $4.9 \leq X \leq 5.1$.

The test results described above only hold good at the temperature of 20° C. In the case of batteries that are to be used at low temperatures of about −20° C. or those that are to be discharged at large current, the amount of Al substitution should be reduced so as to avoid the accompanying increase in overpotential; therefore, the appropriate range of Al substitution is $0.3 \leq B \leq 0.6$. As already mentioned before, the cycle life characteristics of batteries will deteriorate if the degree of Al substitution is too low but a satisfactory cycle life is insured even if $B \leq 0.3$ as demonstrated by the alloy of Run 1-1 (B=0.4) which had an excellent cycle life characteristic. This would be due to the fact that Lm used as the starting material for that alloy contained Ce and Nd which are effective for life extension. Further, Al substitution will not deteriorate the high rate discharge characteristics of batteries unless it is excessive. The range of $B \leq 0.6$ is such that Al substitution can be increased without causing any adverse effects on discharge characteristics.

FIG. 1 shows the relationship between the La content in rare earth elements, the initial discharge capacity and the capacity retention rate after 300 cycles for the alloys shown in Table 1 which had a Ni atomic ratio of 3.5. As in clear from FIG. 1, the initial discharge capacity decreases whereas the capacity retention rate after 300 cycles increases with the decreasing La content in rare earth elements. Among the alloys shown in FIG. 1 are those which contain a large amount of Nd or Ce as rare earth elements other than La. Both of these elements will reduce the discharge capacity as their substitution for La increases but, on the other hand, they are capable of extending the cycle life. FIG. 1 does not show a clear tendency that either discharge capacity or cycle life is significantly improved within a specified range of the La content in rare earth elements. If it is assumed that the discharge capacity required per unit weight of an alloy for practical use is at least 270 mA.h/g, then La must comprise at least 70 wt % of the content of rare earth elements, and if the capacity retention after 300 cycles is required to be at least 70%, La must comprises 90 wt % or less of the content in rare earth elements In other words, practical considerations indicate that both large discharge capacity and good cycle life characteristics are insured if the La content in the content of rare earth elements is within the range of 70 to 90 wt %. However, if the La content in the rare earth elements is about 70 wt %, increased Co substitution may potentially reduce the discharge capacity to less than 270 mA.h/g. From this view point, the La content of rare earth elements is preferably at least 75 wt %. In actual batteries, the capacity of the negative electrode made of a hydrogen absorbing alloy is set to be larger than the capacity of a nickel positive electrode; thus, the depth of discharge at the alloy electrode is about 70 to 80%, and the drop in the capacity of the negative alloy electrode due to repeated charge/discharge cycles will be much smaller than the values obtained in the tests under consideration. The guideline for a capacity retention rate of at least 70% after 300 cycles is proposed to insure that the negative alloy electrode has a greater residual capacity than the positive electrode even after 300 charge/discharge cycles have been repeated at 100% depth of discharge. Since the drop in the capacity of the negative alloy electrode is more moderate in actual batteries, the residual capacity of the negative electrode will not become smaller than that of the positive electrode even after 1,000 cycles.

Figure 2:
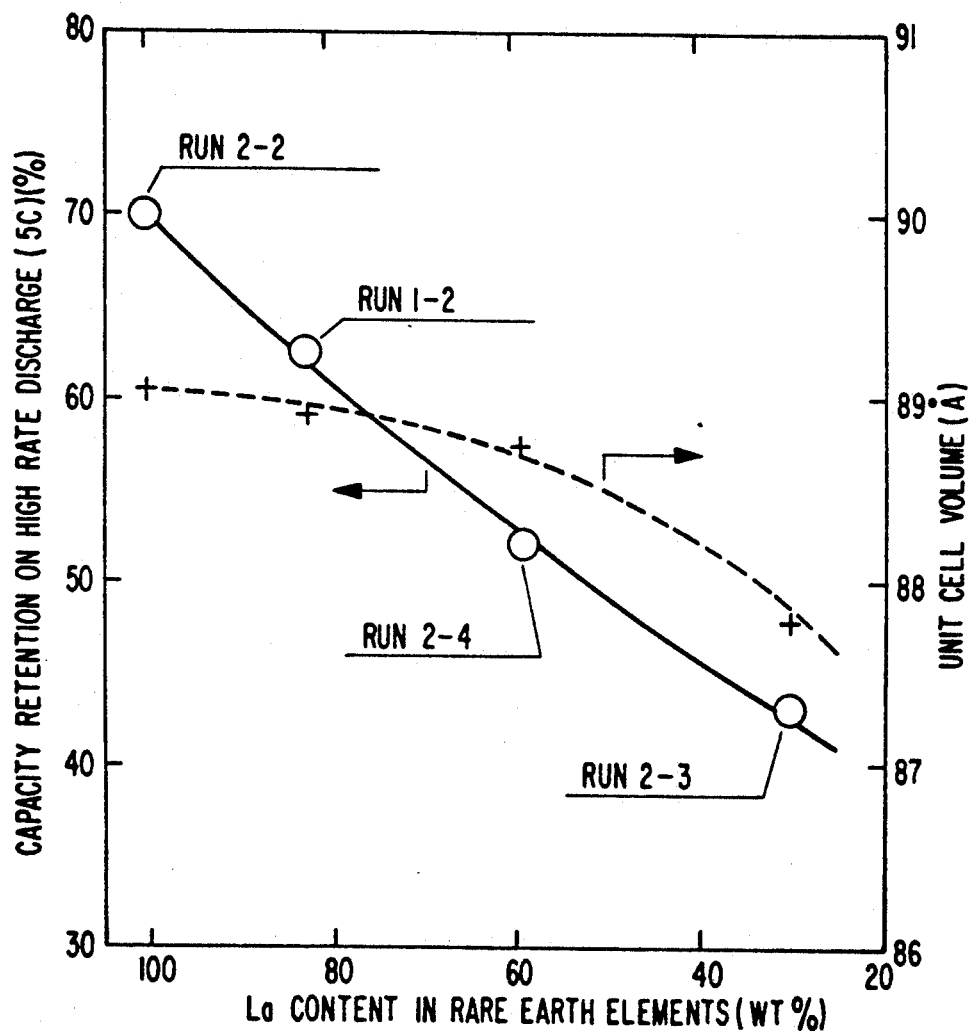
FIG. 2 is a graph showing the effects of the La content in the rare earth elements on the high rate discharge characteristic of a hydrogen absorbing electrode.

FIG. 2 shows the relationship between the La content in the rare earth elements and the capacity retention at high rate discharge at about 5 C for the alloys shown in Table 1 which had a Ni atom ratio of 3.5. Obviously, the capacity retention on high rate discharge gradually decreases with the decreasing content of La in rare earth elements. Result of X-ray diffraction analysis for these hydrogen absorbing alloys shows that the crystal's lattice constant in the direction of a-axis decreases and that in the direction of b-axis increases as the La content in rare earth elements decreases, therefore the unit cell volume decreases with the decreasing amounts of La. As a characteristic of hydrogen absorbing alloys, it is generally known that the hydrogen equilibrium pressure decreases with the increasing cell volume. However, the alloys under present consideration have substantially the same equilibrium pressure due to the adjustment of Al substitution, so the changes in the cell volume described above should not be regarded as the consequence of differences in the equilibrium pressure. In the case of hydrogen absorbing alloys having large cell volumes, it is anticipated that the barrier against the movement of hydrogen atoms through lattices is low and hence hydrogen diffusibility in the alloys is high. FIG. 2 shows that the capacity retention on high rate discharge is high in the alloys with large cell volume (i.e., high content of La in rare earth elements) and this fact seems to suggest the hydrogen diffusibility is high in the alloys with high La content and the resulting potential drop due to this factor (hydrogen diffusion) is reduced. It should also be mentioned here that the amounts of Ni and Al in hydrogen absorbing alloys are other factors which influence the capacity retention on high rate discharge. The alloys under present discussion have the atomic ratio of Ni fixed at 3.5, and the effects of Ni content can be disregarded. However, the alloys in Runs 2-2 and 2-3 are different in the atomic ratio of Al by 0.5 and the drop in capacity retention rate shown in FIG. 2 is the result of the combined effects of the La content in rare earth elements plus the Al content. Although not shown in FIG. 2, an increase of 0.1 in the atomic ratio of Al is known to cause a decrease of about 3 to 4% in the capacity retention, and it is anticipated that about one half of the drop in capacity retention shown in FIG. 2 would have been caused by the effect of Al content. When the La content in rare earth elements is high, less Al is necessary to lower the hydrogen equilibrium pressure, and this effect, combined with the high hydrogen diffusibility, will contribute to an enhanced capacity retention rate on high rate discharge. The rapid discharge characteristics of batteries are not determined solely by the characteristics of electrode alloys, but it is desired for practical purposes to use the alloys which exhibit the highest possible capacity retention on high rate discharge. By increasing the La content in rare earth elements to at least 75 wt %, a capacity retention of at least 60% can be insured even if high rate discharge is performed at a rate equivalent to about 5 C. In actual batteries, the negative electrode made of hydrogen absorbing alloy is set to have a higher capacity than the positive nickel electrode, so unless the batteries are discharged at an unusually high rate, the battery's discharge capacity will not be determined by the capacity of the alloy electrode.

Figure 3:
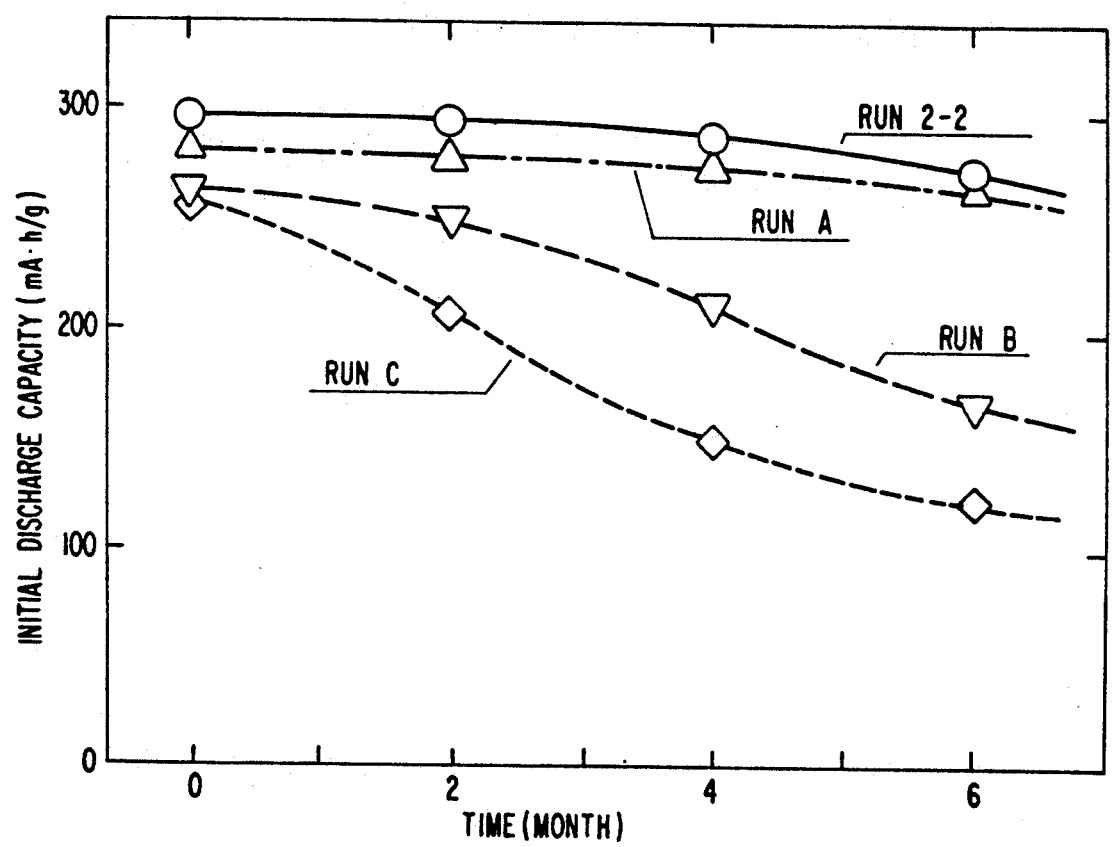
FIG. 3 is a graph showing the profile of the initial discharge capacity of a hydrogen absorbing electrode during prolonged storage under hot and humid conditions.
Figure 4:
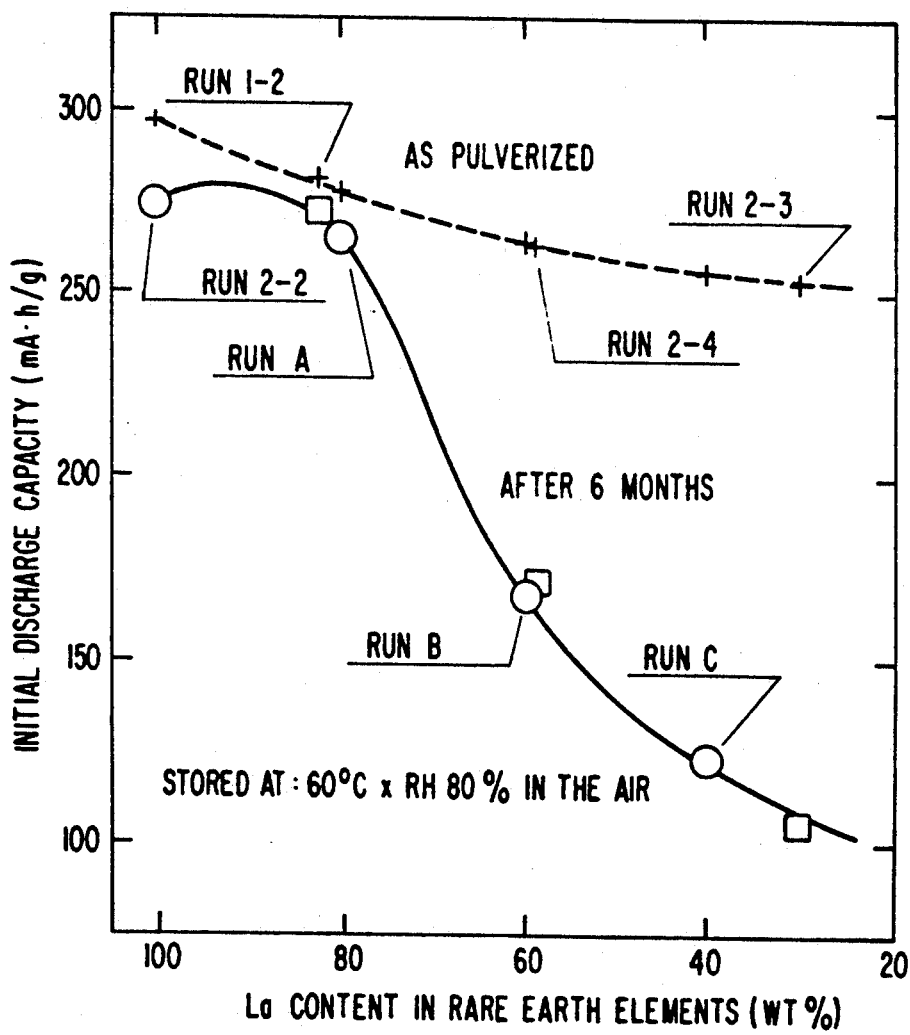
FIG. 4 is a graph showing the effects of the La content in the rare earth elements on the long-term storage characteristic of a hydrogen absorbing electrode.

Another important characteristic of hydrogen absorbing alloys that has to be considered on applying them to a battery, is their long-term storage characteristics. As is well known, hydrogen absorbing alloys are prone to oxidation and the rare earth elements on the alloy surface will become oxidized (during prolonged storage in the air atmosphere). In consideration of the possibility that prepared hydrogen absorbing alloys are stored in powder form for a prolonged time before and during battery fabrication, the alloys must have comparable levels of discharge capacity and other electrode characteristics to those of the freshly pulverized alloys irrespective of the duration of the storage period. To check this point, several alloys with varying La content in rare earth elements were stored in the air atmosphere at a temperature of 60° C. and at a relative humidity of 80%, and the effects of the storage period on the discharge characteristics of the alloys were investigated. The test alloys were $LaNi_{3.5}Co_{1.2}Al_{0.3}$ (Run 2-2) and the following three, in which the content of rare earth elements consisted of La plus a mixture of Nd and Ce at 1:1 atomic ratio: $La_{0.8}Nd_{0.1}Ce_{0.1}Ni_{3.5}Co_{1.1}Al_{0.4}$ (Run A), $La_{0.6}Nd_{0.2}Ce_{0.2}Ni_{3.5}Co_{0.9}Al_{0.6}$ (Run B), and $La_{0.4}Nd_{0.3}Ce_{0.3}Ni_{3.5}Co_{0.7}Al_{0.8}$ (Run C). The profile of the initial discharge capacity of each of these samples vs. storage time is shown in FIG. 3. In the case of the alloy in Run C which had the lowest La content in rare earth elements, the initial discharge capacity dropped to about one half of the discharge capacity in the virgin state (i.e., as first pulverized) as a result of storage for 6 months under hot and humid conditions. The general tendency that can be observed from FIG. 3 is that the smaller the La content in rare earth elements, the larger the drop in initial discharge capacity with the lapse of storage period. In order to verify this point, the relaion of the discharge capacity vs. the La content in rare earth elements was investigated both at the time of initial pulverization and after storage for 6 months. The results are shown in FIG. 4 which also plots the data on three other alloys, Runs 1-2, 2-3 and 2-4. The general tendency observed was the same as already described above; stated more specifically, the capacity drop of alloys during prolonged storage was markedly reduced as the La content in rare earth elements increased from 70 wt % to 80 wt % and the best storage characteristic was attained in the range of from 85 to 90 wt %. The initial discharge capacity after 6 months of each of the alloys in Runs 1-2, 2-4 and 2-3 that were prepared using different mixtures of rare earth elements, Lm, Ln, and Mm, respectively, is also plotted on the solid curve in FIG. 4 and it can be seen that the aforementioned tendency concerning long-term storage characteristics also holds good even at different mixing ratios of Nd to Ce. As the La content in rare earth elements decreases from 80 wt %, the probability of the presence on the alloy surface of Nd and Ce which are more readily oxidizable than La is increased, and this would promote the oxidation of the alloy. It is not completely clear why excellent storage characteristics are attained within the La content range of from 85 to 90 wt %. A probable reason is that the presence in appropriate amounts of Nd and Ce which have larger atomic radii than La produces an effect similar to that of solid solution strengthening, thereby densifying the surface of the alloy. Whatever the reason, hydrogen absorbing alloys that have such a composition that the La content in rare earth elements is at least 75 wt % exhibit very good storage characteristics for a prolonged time and a great benefit for practical purposes will be offered by preparing alloys using starting materials that have the La content in the above specified range.

As discussed on the foregoing pages, hydrogen absorbing electrode alloys that have high capacity, prolonged cycle life, and that also exhibit good high rate discharge and long-term storage characteristics can be produced from Lm with a reasonably high La content by adopting an appropriate compositional design in which part of Ni is replaced with the minimum necessary amounts of Co and Al. For producing alloys that have, practically, the best balance of the characteristics mentioned above, an optimal range for the La content in rare earth elements is from 75 to 90 wt %.

(2) $Lm_{1-x}Zr_xNi_{Y-A-B}Co_AAl_B$ alloys

In order to verify the advantages of this type of alloy, hydrogen absorbing alloys having the compositions shown in Table 2 were subjected to a cycle life test. The method of melting the alloys, the method of fabricating the test electrodes, as well as the test procedure were the same as described under (1) for the $LmNi_{X-A-B}Co_AAl_B$ alloys. The test results are also shown in Table 2 for each alloy. The alloys listed in Table 2 had about the similar hydrogen equilibrium at room temperature each other, which were adjusted to one atmospheric pressure or less by controlling the amount of Al substitution.

TABLE 2

| Run | Hydrogen absorbing alloy | Initial discharge capacity (mA · h/g) | Capacity retention after 300 cycles (%) |
|---|---|---|---|
| 3-1 | $Lm_{0.95}Zr_{0.05}Ni_{3.5}Co_{1.1}Al_{0.4}$ | 268 | 89 |
| 3-2 | $Lm_{0.95}Zr_{0.05}Ni_{3.8}Co_{0.7}Al_{0.5}$ | 276 | 85 |
| 3-3 | $Lm_{0.95}Zr_{0.05}Ni_{4.0}Co_{0.5}Al_{0.5}$ | 284 | 75 |
| 4-1 | $LaNi_{3.5}Co_{1.2}Al_{0.3}$ | 297 | 63 |
| 4-2 | $La_{0.95}Zr_{0.05}Ni_{3.5}Co_{1.2}Al_{0.3}$ | 263 | 71 |
| 4-3 | $La_{0.9}Zr_{0.1}Ni_{3.5}Co_{1.2}Al_{0.3}$ | 249 | 79 |
| 4-4 | $MmNi_{3.5}Co_{0.7}Al_{0.8}$ | 254 | 93 |
| 4-5 | $LmNi_{3.5}Co_{1.1}Al_{0.4}$ | 281 | 74 |
| 4-6 | $LmNi_{4.0}Co_{0.5}Al_{0.5}$ | 295 | 57 |
| 4-7 | $Lm_{0.9}Zr_{0.1}Ni_{3.8}Co_{0.7}Al_{5.0}$ | 258 | 90 |

N.B. The alloys in runs 4-1, 4-4 and 4-5 are the same as the alloys of Runs 2-2, 2-3 and 1-2, respectively, in Table 1.

The alloy in Run 4-1 was prepared using only La as a rare earth element. It had a large initial discharge capacity, but its cycle life characteristic was not very good in view of the drop in discharge capacity after 300 cycles. The alloys in Runs 4-2 and 4-3 had part of La replaced by Zr, and as the amount of Zr substitution increased in the order of Run 4-2 to Run 4-3, the initial discharge capacity decreased. However, the cycle life characteristic had a tendency to improve with the increasing Zr substitution. This is probably because Zr formed a tenacious oxide film on the surface of the alloy particles, thereby retarding the oxidation of the alloy.

The alloy in run 4-4 was prepared using the conventional Ce-rich Mm (30.0 wt % La). Because of the high Ce content, this alloy had a small initial discharge capacity but it cycle life characteristic was very good.

Three additional alloys were prepared using Lm containing 82.5 wt % La, 2.6 wt % Ce, 8.9 wt % Nd and 3.3 wt % Pr (see runs 4-5, 4-6 and 4-7 in Table 2). The alloy of run 4-5 was compositionally equivalent to the alloys of Runs 4-1 and 4-4 in that they contained comparably Ni, Co and Al. This alloy had a comparatively large initial discharge capacity and its capacity retention somewhat low, but may be well regarded as satisfactory for practical purposes. In contrast, the alloy of Run 4-6 had a large initial discharge capacity, but its cycle life was rather short.

The alloys in runs 3-1, 3-2 and 3-3 were within the scope of the present invention, and Lm was partly replaced by Zr in an atomic ratio of 0.05. The discharge capacity increased, but the cycle life characteristics deteriorated in the order of Runs 3-1, 3-2 and 3-3 as the amount of Co substitution decreased. The alloy of Run 3-1 had the smallest initial discharge capacity among these three alloys but compared to the alloy of Run 4-4, the initial discharge capacity of Run 3-1 was significantly large and yet its cycle life characteristic was almost comparable to that of Run 4-4. As is apparent from a comparison between Runs 4-5 and 3-1 and between Runs 4-6 and 3-3, replacing part of Lm with Zr caused a drop in initial discharge capacity, but, on the other hand, the cycle life characteristics were remarkably improved. As already mentioned, this improvement would be ascribable to the formation of a tenacious zirconium oxide film on the alloy surface due to Zr substitution, which eventually retarded the oxidation of rare earth elements. However, excessive Zr substitution will reduce the absorption of available hydrogen because Zr forms intermetallic compounds (e.g. $ZrNi_2$) with other elements, as was demonstrated in Run 4-7. The alloy of Run 4-7 was similar to the alloys of the present invention except that the atomic ratio of Zr was 0.1. The initial discharge capacity of this alloy was considerably smaller than that of the alloy in Run 3-2. The same result was observed when the alloy of Run 4-2 was compared with the alloy of Run 4-3. From empirical viewpoints, the atomic ratio of Zr is preferably not more than 0.08 in order to prevent the formation of unwanted intermetallic compounds or to insure that the formation of such compounds will not cause a significant drop in discharge capacity.

Although not mentioned above, the cycle life characteristics of alloys represented by the formula La (or Lm or Mm)$Ni_Z$ will deteriorate if the ratio of La (or Lm or Mm) to Ni deviates from the stoichiometric value 1:5 (Z=5). As already mentioned under (1), the drop in capacity retention rate is desirably 15% or less, so the value of Z in the alloys represented by the compositional formula La(or Lm or Mm)$Ni_Z$ must be within the range of 4.9 to 5.1.

The test results described above only hold good at the temperature of 20° C. In the case of batteries that are to be used at low temperatures of about −20° C. or those that are to be discharged at large current, the amount of Al substitution should be reduced so as to avoid the accompanying increase in overpotential. In consideration of this point, the appropriate range of Al substitution is $0.3 < B \leq 0.6$. As already mentioned, the cycle life characteristics of batteries may deteriorate if the degree of Al substitution is too low, but it is expected that a satisfactory cycle life can be insured even if $B \leq 0.3$ as demonstrated by the alloy of Run 3-1 (B=0.4) which had an excellent cycle life characteristic. This is probably because Lm used as the starting material contained Ce and Nd which are effective for life extension. Further, as will be mentioned later, Al substitution will not be deleterious to the high rate discharge characteristics of batteries unless it is excessive. The range of $B \leq 0.6$ is such that Al substitution can be increased without causing any adverse effects of high rate discharge characteristics.

The above results show that the newly developed hydrogen absorbing electrode alloys represented by the formula $Lm_{1-X}Zr_XNi_{Y-A-B}Co_AAl_B$ exhibit better capacity and life characteristics than the conventional alloy of Run 4-4 if their composition satisfies the relationships $0.01 \leq X \leq 0.08$, $4.9 \leq Y \leq 5.1$, $1.0 \leq A+B \leq 1.5$, $0.5 \leq A \leq 1.1$, and $0.3 \leq B \leq 0.6$. Alloys having even better electrode characteristics can be obtained if X=0.05, Y=5.0, $1.0 \leq A+B \leq 111.5$, $0.5 \leq A \leq 1.1$ and $0.4 \leq B \leq 0.5$.

Table 3 shows the high rate discharge characteristics of some of the alloys shown in Table 2.

TABLE 3

| Run | Hydrogen absorbing alloy | Capacity retention on high rate discharge (%) |
|---|---|---|
| 3-1 | $Lm_{0.95}Zr_{0.05}Ni_{3.5}Co_{1.1}Al_{0.4}$ | 66 |
| 3-2 | $Lm_{0.95}Zr_{0.05}Ni_{3.8}Co_{0.7}Al_{0.5}$ | 72 |
| 3-3 | $Lm_{0.95}Zr_{0.05}Ni_{4.0}Co_{0.5}Al_{0.5}$ | 77 |
| 4-1 | $LaNi_{3.5}Co_{1.2}Al_{0.3}$ | 70 |
| 4-4 | $MmNi_{3.5}Co_{0.7}Al_{0.8}$ | 43 |
| 4-5 | $LmNi_{3.5}Co_{1.1}Al_{0.4}$ | 65 |
| 4-6 | $LmNi_{4.0}Co_{0.5}Al_{0.5}$ | 78 |

N.B. See the footnote to Table 2.

As already mentioned, the alloy in Run 4-1 was rather poor in cycle life characteristic, but it experienced a comparatively small drop in discharge capacity on high rate discharge at 0.2 h rate. Compared to a known alloy having the composition of $LaNi_{2.5}Co_{2.4}Al_{0.1}$ which has a capacity retention of 48%, the alloy of Run 4-1 exhibits a fairly good high rate discharge characteristic. This is probably because the higher the Ni content of the alloy, the higher the catalytic activity at the surface, thereby insuring smooth progress of the electrode reaction.

The alloy in Run 4-4 had a somewhat small initial discharge capacity but its cycle life characteristic was satisfactory. Nevertheless, it experienced a considerable capacity drop as a result of high rate discharge. In the case of this alloy, high Al substitution increased the overpotential, which eventually caused a substantial capacity drop during high rate discharge.

The alloys in Runs 4-5 and 4-6 also had high Ni contents and their high rate discharge characteristics were as good as that of the alloy in Run 4-1. Of these two alloys, Run 4-6 having the higher Ni content exhibited the better high rate discharge characteristic probably for the same reason as described in connection with the alloy of Run 4-1.

The alloys in Runs 3-1, 3-2 and 3-3 had excellent high rate discharge characteristics and the capacity retention on high rate discharge were at substantially equivalent levels to those of the alloys in Runs 4-5 and 4-6. In the case of alloys prepared by Zr substitution, their cycle life characteristics would be improved by the formation of an oxide film on the alloy surface and the resulting oxide film will not deteriorate the high rate discharge characteristics of the alloys for the following probable reasons. First, the oxide film formed by Zr substitution is porous and will not impede the diffusion of H+ ions. Second, Zr substitution is for La(or Mm) and surplus Ni that occurs as the result of the formation of the oxide film is simultaneously freed from the alloy surface to act in a way to enhance the catalytic activity on the surface. The Ni content of alloys increased in the order of Runs 3-1, 3-2 and 3-3, and the capacity retention on high rate discharge increased accordingly. As already mentioned, a probable reason for this improvement is that the higher the Ni content of the alloy, the higher the catalytic activity at the surface, thereby insuring smooth progress of the electrode reaction.

Although there is no available test data, the long-term storage characteristics of LmZrNiCoAl alloys would be basically the same as described in (1) for the LmNiCoAl alloys. In other words, when a mixture of rare earth elements such as Mm which has a high content of Ce is used as a starting material, the presence of easily oxidizable Ce on the alloy surface will promote the oxidation of the alloy even in an air atmosphere. In the alloys having part of Mm replaced by Zr, the deterioration of characteristics during prolonged storage may be somewhat reduced by the formation of a zirconium oxide film, but as long as the cause of such deterioration is unavoidable, deterioration will inevitably occur under hostile conditions such as hot and humid conditions. In order to prevent such deterioration of characteristics due to the oxidation of the alloy, the best way is to reduce the Ce content and the Nd content in rare earth elements, thereby increasing the La content. In the case of LmNiCoAl alloys, it was concluded on the basis of the results shown in FIG. 4 that the La content in rare earth elements must be at least 75 wt % because the initial discharge capacity of alloys dropped markedly when the La content was less than 75 wt %. In the case of LmZrNiCoAl alloys, the aforementioned effect of Zr substitution may reduce the critical value of La to somewhat less than 75 wt %. However, if the La content is at least 75 wt % of rare earth elements, the deterioration of alloy's characteristics due to its oxidation can inevitably be avoided. Therefore, even in the case of LmZrNiCoAl alloys, it is important for the purpose of improving the long-term storage characteristics that the La content in Lm used as the starting material should be 75 wt % or more.

As discussed on the foregoing pages, the hydrogen absorbing electrode alloys that have high capacity and prolonged cycle life, and that also exhibit good high rate discharge and long-term storage characteristics can be produced from Lm with a reasonably high La content by adopting a compositional design in which part of Lm is replaced by Zr (this may result in a somewhat smaller initial discharge capacity) and in which the amount of Co substitution is smaller than in the previously discussed LmNiCoAl alloys. For producing the alloys that have, practically, the best balance of the characteristics mentioned above, an optimal range for the La content in rare earth elements is from 75 to 90 wt %.

(3) $Lm_{1-x}Zr_xNi_{Y-A-B-C}Co_AMn_BAl_C$ alloys

In order to verify the advantages of this type of alloys, the hydrogen absorbing alloys having the compositions shown in Table 4 were subjected to a cycle life test. The method of melting the alloys, the method of fabricating the test electrodes, as well as the test procedure were the same as described under (1) for the $LmNi_{X-A-B}Co_AAl_B$ alloys. The test results are also shown in Table 4 for each alloy. The alloys listed in Table 4 had about the similar hydrogen equilibrium at room temperature each other, which were adjusted to one atmospheric pressure or less by controlling the amount of Al substitution.

TABLE 4

| Run | Hydrogen absorbing alloy | Initial discharge capacity (mA · h/g) | Capacity retention after 300 cycles (%) |
|---|---|---|---|
| 5-1 | $Lm_{0.95}Zr_{0.05}Ni_{3.5}Co_{1.1}Mn_{0.2}Al_{0.2}$ | 286 | 79 |
| 5-2 | $Lm_{0.95}Zr_{0.05}Ni_{3.8}Co_{0.7}Mn_{0.3}Al_{0.2}$ | 309 | 81 |
| 5-3 | $Lm_{0.95}Zr_{0.05}Ni_{4.0}Co_{0.6}Mn_{0.2}Al_{0.2}$ | 313 | 72 |
| 6-1 | $LaNi_{3.5}Co_{1.2}Al_{0.3}$ | 297 | 63 |
| 6-2 | $MmNi_{3.5}Co_{0.7}Al_{0.8}$ | 254 | 93 |
| 6-3 | $MmNi_{3.3}Co_{0.8}Mn_{0.5}Al_{0.4}$ | 275 | 59 |
| 6-4 | $Mm_{0.95}Zr_{0.05}Ni_{3.3}Co_{0.8}Mn_{0.5}Al_{0.5}$ | 268 | 76 |
| 6-5 | $LmNi_{3.5}Co_{1.1}Al_{0.4}$ | 281 | 74 |
| 6-6 | $LmNi_{3.5}Co_{1.1}Mn_{0.2}Al_{0.2}$ | 307 | 65 |
| 6-7 | $LmNi_{4.0}Co_{0.6}Mn_{0.2}Al_{0.2}$ | 321 | 51 |
| 6-8 | $Lm_{0.9}Zr_{0.1}Ni_{3.8}Co_{0.7}Mn_{0.2}Al_{0.3}$ | 284 | 75 |

N.B. The alloys in Runs 6-1, 6-2, and 6-5 are the same as the alloys of Runs 2-2, 2-3 and 1-2, respectively, in Table 1.

The alloy in Run 6-1 was prepared using only La as a rare earth element. IT had a large initial discharge capacity, but its cycle life characteristic was not very good in view of the drop in discharge capacity after 300 cycles.

The alloy in Run 6-2 was prepared using Ce-rich Mm as a starting material. Compared to the alloy of Run 6-1, the alloy of Run 6-2 had a small initial discharge capacity and an improved cycle life characteristic.

The alloy in Run 6-3 was based on the composition of Run 6-2 except that part of Ni was replaced by Mn. This alloy had a larger discharge capacity than that the alloy of Run 6-2 but its cycle life characteristic was significantly lower. The alloy in Run 6-4 was the same as the alloy of Run 6-3 except that part of Mm was replaced by Zr. Due to Zr substitution, the alloy of Run 6-4 had a somewhat smaller discharge capacity than the alloy of Run 6-3 but its cycle life characteristic was improved. As already mentioned, a probable reason for this improvement is that Zr formed a tenacious oxide film on the surface of the alloy particles.

Three additional alloys were prepared using Lm containing 82.5% wt % La, 2.6 wt % Ce, 8.9 wt % Nd and 3.3 wt % Pr (see Runs 6-5, 6-6 and 6-7 in Table 4). The alloy of Run 6-5 was compositionally equivalent to the alloys of Runs 6-1 and 6-2 in that they contained comparably Ni, Co and Al. This alloy had a comparatively large initial discharge capacity and its capacity retention rate was somewhat low but may be well regarded as satisfactory for practical purposes in terms of cycle life characteristic. In contrast, the alloy of Run 6-6, which had part of Ni replaced with Mn, had a considerably larger initial discharge capacity than the alloy of Run 6-5, but its cycle life characteristic was lower. The alloy of Run 6-7 having low Co substitution exhibited a large initial discharge capacity but its cycle life was rather short.

The alloys in Runs 5-1, 5-2 and 5-3 were within the scope of present invention and Lm was partly replaced by Zr in atomic ratio of 0.05. The initial discharge capacity increased but the cycle life characteristics deteriorated in the order of Runs 5-1, 5-2 and 5-3 as the amount of Co substitution decreased. As is apparent from a comparison between Runs 6-6 and 5-1 and between Runs 6-7 and 5-3, replacing part of Lm with Zr caused a drop in initial discharge capacity, but, on the other hand, the cycle life characteristics were remarkably improved. As already mentioned, this improvement would be ascribable to the formation of a tenacious oxide film on the alloy surface due to Zr substitution, which eventually retarded not only the oxidation of rare earth elements, but also the dissolution of Mn. However, excessive Zr substitution will simply result in the reaction of Zr with other elements to form intermetallic compounds (e.g. $ZrNi_2$) and the absorption of available hydrogen will be reduced, as was demonstrated in Run 6-8. The alloy of Run 6-8 was similar to the alloys of the present invention except that the atomic ratio of Zr was 0.1. The initial discharge capacity of this alloy was considerably smaller than that of the alloy in Run 5-2. From empirical viewpoints, the atomic ratio of Zr is preferably not more than 0.08 in order to prevent the formation of unwanted intermetallic compounds. The electrode performance of the alloy in Run 6-8 was almost satisfactory for practical purposes, but it is excluded from the scope of the claims of the present invention because an unwanted phase appeared.

Although not mentioned above, the cycle life characteristics of alloys represented by the formula La (or Lm or Mm)$Ni_z$ will deteriorate if the ratio of La (or Lm or Mm) to Ni deviates from the stoichiometric value 1:5 ($Z=5$). Since a guide figure for the desirable upper limit of the drop in capacity retention rate is 15% and below, the value of Z in the alloys represented by the compositional formula La(or Lm or Mm)$Ni_z$ must be within the range of 4.9–5.1.

The test results described above only hold good at the temperature of 20° C. In the case of batteries that are to be used at low temperatures of about −20° C. or those that are to be discharged at large current, the amount of Al substitution should be reduced so as to avoid the accompanying increase in overpotential. As already mentioned before, the cycle life characteristics of alloys may deteriorate if the degree of Al substitution is too low, but the range of $0.1 \leq C \leq 0.2$ is satisfied by alloy compositions close to that of Run 5-1. Since Lm used as the starting material for that alloy contained Ce and Nd which are effective for life extension, it is expected that a satisfactory cycle life can be insured even if $C \leq 0.1$. Further, Al substitution will not be deleterious to the high rate discharge characteristics as discussed below unless it is excessive. As mentioned under (2) for the LmZrNiCoAl alloys with reference to Run 3-1, the range of $C \leq 0.4$ is such that Al substitution can be increased without causing any adverse effects on high rate discharge characteristics. In the light of the foregoing discussion, the appropriate range for Al substitution is $0.1 \leq C \leq 0.4$.

The above results show that the newly developed hydrogen absorbing electrode alloys represented by the formula $Lm_{1-x}Zr_xNi_{Y-A-B-C}Co_AMn_BAl_C$ are believed to exhibit excellent electrode characteristics if their composition satisfies the relationships $0.01 \leq X \leq 0.08$ and $4.9 \leq Y \leq 5.1$. From the viewpoints of initial discharge capacity and cycle life, it is most desirable to satisfy the following compositional relationships: $X=0.05$, $Y=5.0$, $1.0 \leq A+B+C \leq 1.5$, $0.6 \leq A \leq 1.1$, $0.2 \leq B \leq 0.3$, and $C=0.2$.

Table 5 shows the high rate discharge characteristics of some of the alloys shown in Table 4.

TABLE 5

| Run | Hydrogen absorbing alloy | Capacity retention on high rate discharge (%) |
| --- | --- | --- |
| 5-1 | $Lm_{0.95}Zr_{0.05}Ni_{3.5}Co_{1.1}Mn_{0.2}Al_{0.2}$ | 67 |
| 5-2 | $Lm_{0.95}Zr_{0.05}Ni_{3.8}Co_{0.7}Mn_{0.3}Al_{0.2}$ | 70 |
| 5-3 | $Lm_{0.95}Zr_{0.05}Ni_{4.0}Co_{0.6}Mn_{0.2}Al_{0.2}$ | 72 |
| 6-1 | $LaNi_{3.5}Co_{1.2}Al_{0.3}$ | 70 |
| 6-2 | $MmNi_{3.5}Co_{0.7}Al_{0.8}$ | 43 |
| 6-5 | $LmNi_{3.5}Co_{1.1}Al_{0.4}$ | 65 |
| 6-6 | $LmNi_{3.5}Co_{1.1}Mn_{0.2}Al_{0.2}$ | 68 |

N.B. See the footnote to Table 4.

As already mentioned, the alloy in Run 6-1 was rather poor in cycle life characteristic but it experienced a comparatively small drop in discharge capacity on high rate discharge at a 0.2 h rate. Compared to the known alloy having the composition of $LaNi_{2.5}Co_{2.4}Al_{0.1}$ which has a capacity retention rate of 48%, the alloy of Run 6-1 exhibits a fairly good high rate discharge characteristic. This is probably because the higher the Ni content of the alloy, the higher the catalytic activity on the surface, thereby insuring smooth progress of the electrode reaction.

The alloy in Run 6-2 had a somewhat small initial discharge capacity but its cycle life characteristic was satisfactory. Nevertheless, it experienced a considerable capacity drop as a result of high rate discharge. In the case of this alloy, high Al substitution increased the overpotential, which eventually caused a substantial capacity drop on high rate discharge.

The alloys in Runs 6-5 and 6-6 also had high Ni contents, and their discharge characteristics were as good as that of the alloy in Run 6-1. Of the set two alloys, the alloy in Run 6-6 involving Mn substitution exhibited the better high rate discharge characteristic, probably because dissolving Mn rendered the alloy surface Ni-rich.

The alloys in Runs 5-1, 5-2 and 5-3 had excellent high rate discharge characteristics, which were almost comparable to or even better than the levels of the alloys in Runs 6-5 and 6-6. Thus, Zr substitution is effective not only for improving cycle life characteristics, but also for preventing the drop in high rate discharge characteristics in the presence of an oxide film.

Although there is no test data available, the long-term storage characteristics of LmZrNiCoMnAl alloys would be basically the same as described in (1) for the LmNiCoAl alloys. In other words, when a mixture of rare earth elements such as Mm which has a high content of Ce is used as a starting material, the presence of easily oxidizable Ce on the alloy surface will promote the oxidation of the alloy even in an air atmosphere. In the alloy having part of Mm replaced by Zr, the deterioration of characteristics during prolonged storage may be somewhat reduced by the formation of a zirconium oxide film, but as long as the cause of such deterioration is unavoidable, deterioration will inevitably occur under hostile conditions such as hot and humid conditions. In order to prevent such deterioration of characteristics due to the oxidation of the alloy, the best way is to reduce the Ce content and the Nd content in rare earth elements, thereby increasing the La content. In the case of LmNiCoAl alloys, it was concluded on the basis of the results shown in FIG. 4 that the La content in rare earth elements must be at least 75 wt %, because the initial discharge capacity of alloys dropped markedly when the La content was less than 75 wt %. In the case of LmZrNiCoMnAl alloys, the aforementioned effect of Zr substitution may reduce the critical value of La to somewhat less than 75 wt %. However, if the La content is at least 75 wt % of rare earth elements, the deterioration of alloy's characteristics due to its oxidation can inevitably be avoided. Therefore, even in the case of LmZrNiCoMnAl alloys, it is important for the purpose of improving the long-term storage characteristics that the La content in Lm used as the starting material should be 75 wt % or more.

As discussed on the foregoing pages, the hydrogen absorbing electrode alloys that have high capacity and prolonged cycle life and that also exhibit good high rate discharge and long-term storage characteristics can be produced from Lm with a reasonably high La content by adopting a compositional design in which part of Lm is replaced by Zr and part of Ni by Mn. For producing the alloys that have, practically, the best balance of the characteristics mentioned above, an optimal range for the La content in rare earth elements is from 75 to 90 wt %.

While the invention has been described in detailed with reference to specific embodiments, it will be apparent to one skilled in the art that various changes and modifications can be made to the invention without departing from its spirit and scope.

What is claimed is:

1. A hydrogen absorbing electrode comprising an alloy that is represented by the formula containing 75 to 90 wt % La, with the balance being other rare earth elements, and X, A, and B are defined by the relationships $4.9 \leq X \leq 5.1$, $1.2 \leq A+B \leq 2.0$, $0.7 \leq A \leq 1.6$, and $0.3 \leq B \leq 0.6$.

2. A hydrogen absorbing electrode as in claim 1, wherein A and B are defined by the relationships $1.2 \leq A+B \leq 2.0$, $0.7 \leq A \leq 1.6$, and $0.4 \leq B \leq 0.5$.

3. A hydrogen absorbing electrode comprising an alloy that is represented by the formula $Lm_{1-X}Zr_XNi_{Y-A-B}Co_AAl_B$, wherein Lm is a lanthanum-rich misch metal containing 75 to 90 wt % La, with the balance being other rare earth elements, and X, Y, A, and B are defined by the relationships $0.01 \leq X \leq 0.08$, $4.9 \leq Y \leq 5.1$, $1.0 \leq A+B \leq 1.5$, $0.5 \leq A \leq 1.1$, and $0.3 \leq B \leq 0.6$.

4. A hydrogen absorbing electrode as in claim 3, wherein X, Y, A, and B are defined by the relationships $X=0.05$, $Y=5.0$, $1.0 \leq A+B \leq 1.5$, $0.5 \leq A \leq 1.1$, and $0.4 \leq B \leq 0.5$.

5. A hydrogen absorbing electrode comprising an alloy that is represented by the formula $Lm_{1-X}Zr_XNi_{Y-A-B-C}Co_AMn_BAl_C$, wherein Lm is a lanthanum-rich misch metal containing 75 to 90 wt % La, with the balance being other rare earth elements, and X, Y, A, B, and C are defined by the relationships $0.01 \leq X \leq 0.08$, $4.9 \leq Y \leq 5.1$, $1.0 \leq A+B+C \leq 1.5$, $0.6 \leq A \leq 1.1$, $0.2 \leq B \leq 0.3$ and $0.1 \leq C \leq 0.5$.

6. A hydrogen absorbing electrode as in claim 5, wherein wherein X, Y, A, B, and C are defined by the relationships $X=0.05$, $Y=5.0$, $1.0 \leq A+B+C \leq 1.5$, $0.6 \leq A \leq 1.1$, $0.2 \leq B \leq 0.3$ and $C=0.2$.

* * * * *